United States Patent
St. Lawrence (10) Patent No.: US 10,476,578 B2
(45) Date of Patent: Nov. 12, 2019

(54) RADIO FREQUENCY EXTENDER DEVICE FOR EXTENDING AN EFFECTIVE RANGE OF WIRELESS RADIO FREQUENCY NETWORKS BY A COMBINATION OF WIRELESS AND WIRED CONNECTIONS

(71) Applicant: Thomas St. Lawrence, Angleton, TX (US)

(72) Inventor: Thomas St. Lawrence, Angleton, TX (US)

( * ) Notice: Subject to any disclaimer, the term of this patent is extended or adjusted under 35 U.S.C. 154(b) by 0 days.

(21) Appl. No.: 16/156,051

(22) Filed: Oct. 10, 2018

(65) Prior Publication Data

US 2019/0115973 A1    Apr. 18, 2019

Related U.S. Application Data

(60) Provisional application No. 62/570,152, filed on Oct. 10, 2017.

(51) Int. Cl.
*H04B 7/155* (2006.01)
*H04W 4/80* (2018.01)

(52) U.S. Cl.
CPC ............... *H04B 7/155* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 4,520,674 A | | 6/1985 | Canada et al. |
| 5,550,813 A | * | 8/1996 | Vella-Coleiro ........ H01Q 1/246 370/281 |
| 5,602,757 A | | 2/1997 | Haseley |
| 5,847,658 A | | 12/1998 | Irie et al. |
| 6,006,164 A | | 12/1999 | McCarty et al. |
| 9,313,072 B2 | * | 4/2016 | Katabi ................. H04L 27/265 |
| 2005/0113066 A1 | * | 5/2005 | Hamberg .......... H04L 29/06027 455/411 |
| 2005/0284226 A1 | | 12/2005 | Boda et al. |
| 2009/0231153 A1 | | 9/2009 | Hauenstein et al. |

* cited by examiner

*Primary Examiner* — Mohammed Rachedine
(74) *Attorney, Agent, or Firm* — Egbert Law Offices, PLLC (57) ABSTRACT

A radio frequency extender device has a radio frequency transmitter, a receiver positioned at a location remote from said radio frequency transmitter, and a cable conductor extending between said radio frequency transmitter and said receiver. The cable conductor has one end spaced away from said radio frequency transmitter and an opposite end spaced away from the receiver. The cable conductor adapted to transmit the transmission from the radio frequency transmitter to the receiver. The receiver produces a humanly perceivable signal from the transmission from the radio frequency transmitter. The radio frequency transmitter can be an instrument or a vibration sensor with a Bluetooth™ device connected thereto.

17 Claims, 7 Drawing Sheets

RADIO FREQUENCY EXTENDER DEVICE FOR EXTENDING AN EFFECTIVE RANGE OF WIRELESS RADIO FREQUENCY NETWORKS BY A COMBINATION OF WIRELESS AND WIRED CONNECTIONS

CROSS-REFERENCE TO RELATED APPLICATIONS

The present application claims priority from U.S. Provisional Patent Application Ser. No. 62/570,152, filed on Oct. 10, 2017, and entitled "Radio Frequency Extender Device for Extending an Effective Range of Wireless Radio Frequency Networks by a Combination of Wireless and Wired Connections".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to articles and devices for extending the range of wireless radio frequency networks. More particularly, the present invention relates to the linking of two or more wireless radio frequency networks using a combination of wireless and wired connections. More particularly, the present invention relates to extender devices for use in connection with radio frequency transmitters and receivers in the range of 2-5 GHz. More particularly, the present invention relates to radio frequency extender devices which extend the range of the radio frequency signal associated with vibration sensors.

2. Description of Related Art Including Information Disclosed Under 37 CFR 1.97 and 37 CFR 1.98

Currently, there is a wide variety of devices that emit high-frequency radio waves. These high-frequency radio waves are in the range of 2-5 GHz. In particular, this frequency is associated Zigbee, Bluetooth, and Wi-Fi wireless systems. Under normal circumstances, the radio frequency transmitter, with these high-frequencies, must be within close proximity of the receiver. Typically, for devices such as Bluetooth, the receiver must be within thirty feet of the transmitter. If the distance is greater than thirty feet, then the receiver will not communicate or connect with the radio frequency signal.

In certain circumstances, it is desirable to extend the effective range of the discrete wireless radio frequency networks. Additionally, it is often desirable to connect two or more remote wireless radio frequency networks to a single destination. As a result, the high-frequency transmission can be received at a distance quite removed from that of the transmitter.

High-frequency transmission is applied in a wide variety of areas. In particular, this high-frequency transmission is often used so as to transmit sound, such as music or voice, to a speaker. In other circumstances, these high-frequency transmissions (in the range of 2-5 GHz) can be associated with detection instruments. These detection instruments can be associated with sensors that detect a quality or condition of a machine. A radio frequency receiver can then be placed into proximity with the high-frequency transmitter so as to provide a humanly perceivable display as to the condition monitored by the sensor. In one circumstance, vibration sensors can employ high-frequency radio transmission for the detection of a condition of the rotating elements of machinery.

By design, machinery having rotative elements, which are coupling connected, experience vibratory motion. This vibratory motion may be generated by rotation of elements such as the following: machine bearings, such as bearing races, or defective ball bearings; misalignment of machine assemblies, such as gears, motors, or shafts and imbalance of machine assemblies, such as motors, rotors, gears, pistons and fans. The vibratory motion of such machine assemblies may be expressed in the form of a vibration signature or a vibration footprint. This vibration signature or vibration footprint may be graphically illustrated.

The present and future condition of machinery may be determined and predicted by analyzing predetermined vibration signatures of individual machinery. Determining the present and future conditions of machinery is essential for maintaining such machinery on-line and contributing to an essential manufacturing process. The machinery to be studied may include rotating type machinery, such as motors, fans, pumps, and air compressors. In the example of air compressors, the rotary screw-type air compressors typically supply the entire pneumatic requirements for a manufacturing facility. In such an example, if the rotary screw air compressors fail in their essential function, production at the manufacturing facility will most likely cease until such time as the fault condition is remedied or a back-up pneumatic supply is located. This, of course, may cause a great loss of revenue for the affected manufacturing facility. Ideally, a potential fault condition of a machine should be identified as early as possible to permit a facility manager to schedule "downtime" and machine maintenance in a cost-effective manner.

In order to avoid the loss of revenue caused by down equipment, manufacturing facility managers have, in the past, employed independent firms that specialize in the field of predictive vibration monitoring of machinery. It is the purpose of such firms to supply personnel to a manufacturing facility for the purpose of performing on-site vibration monitoring. As is well known, in order to effectively perform predictive vibration monitoring of machinery, the "normal" vibration signatures of all the rotated components must be known before predictive vibration monitoring is performed. These "normal" vibration signatures of the rotative components serve as a benchmark from which to evaluate all other vibration signatures.

Vibration monitoring is an accepted proven diagnostic tool for assessing rotating equipment health. Periodic monitoring of machine vibration is a principle component of preventive maintenance programs in industry. The conditions that vibration monitoring can detect are bearing condition, shaft straightness, out-of-balance condition, out-of-alignment condition, wear, product buildup, process change, corrosion, and looseness.

Vibration monitoring equipment can be expensive, in the tens of thousands of dollars. As such, in the past, only very expensive rotating equipment have monitors attached for continuous monitoring. A typical chemical plant has one thousand pumps installed and in operation. There may be less than ten pumps or pieces of equipment in a typical chemical plant that fit the criterion that would justify the expense of dedicated vibration monitors. For 99% of the rotating equipment that cannot justify the expense of continuous vibration monitoring, either no vibration measurement is employed, or a walk-around vibration program is used employing expensive portable vibration equipment and manual labor expense. The periodic monitoring requires trained personnel to collect the vibration in a consistent manner and the timely analysis of the collected data to determine equipment health. Most plants that collect vibration data do not have staffing to analyze the vibration data in a timely manner and do not catch problems before catastrophic failure occur. The vibration analysis should be used as a predictive tool to give an early warning of impending failure so that maintenance can be performed to minimize equipment and production loss.

Currently, vibration monitors are employed on machines so as to continually or periodically detect the vibration from the machine. Occasionally, these vibration monitors are hard-wired to a monitor so that a display will indicate the nature of the vibration. Recently, certain vibration monitors have Bluetooth capability. In the event of such Bluetooth capability, a person will do a walk-around in proximity to the vibration monitor. The Bluetooth capability will send a signal to an adjacent location so that the monitored vibration sensor can be accessed. Typically, these Bluetooth vibration monitors only have the capacity to transmit the Bluetooth signal for a distance of thirty feet or less. In certain circumstances, the vibration sensor may be in a remote and difficult-to-access location. As such, it can be extremely difficult for the person to move into proximity to the vibration sensor so as to receive the collected data from the sensor. Additionally, the personnel required to carry out such a walk-around can add considerable expense to the company employing vibration sensors. In other circumstances, workers will need to move into potentially hazardous locations in order to properly pick-up the Bluetooth signal from the vibration sensor. As such, a need has developed so as to provide an extender device wherein the Bluetooth signal can be transmitted a significant distance away from the rotating machine and the vibration sensor.

In the past, various patents have issued relating to vibration monitoring devices. For example, U.S. Pat. No. 4,520,674, issued on Jun. 4, 1985 to Canada et al., describes a vibration monitoring device for use in connection with a base computer which stores data regarding the nature and parameters of vibration measurements to be made on preselected machines for predictive maintenance purposes. The device includes a power module which energizes the various components. A vibration sensor produces an analog signal which is representative of selected vibration parameters. The signal generated by the vibration monitor is conditioned by a signal conditioning module which includes anti-aliasing filters which enhance the accuracy of the data collected. A multiple function module includes various selectively energized modules which enhance the speed and reliability of the data collected. This data is analyzed by microprocessors and displayed as desired.

U.S. Pat. No. 5,602,757, issued on Feb. 11, 1997 to Haseley et al., shows a vibration monitoring system which includes a micro-controller and a machine to be monitored. The machine to be monitored includes at least one rotating element. At least one sensor is operatively connected to the machine. The sensor is operable to convert mechanical motion generated by this rotating element into a corresponding electrical signal. The sensor inputs the corresponding electrical signal to the micro-controller. A communication system is disposed between the micro-controller and the monitored machine. The communication system enables the micro-controller to correlate a predetermined operational state of the monitored system with a corresponding electrical signal generated by the sensor. A memory communicates with the micro-controller and stores a predetermined logic routine, at least one corresponding electrical signal and at least one predetermined key frequency of the rotating element. The micro-controller utilizes the predetermined logic routine to process the electrical signal into corresponding vibration data of the monitored machine.

U.S. Pat. No. 5,847,658, issued on Dec. 8, 1998 to Irie et al., provides a vibration monitor and monitoring method so as to produce a monitor which can correctly distinguish normal from abnormal vibration by using automatically selected monitoring features and algorithms. The monitor has a sensor that detects the vibration of an object. The monitor is operated in a learning mode when the object is vibrating normally. The waveform of the vibration detected by the sensor is sampled over an appropriate period and analyzed. The data for each sampling feature is subjected to statistical processing and the data which show slight changes are extracted as monitoring features.

U.S. Pat. No. 6,006,164, issued on Dec. 21, 1999 to McCarty et al., teaches a portable vibration monitor which comprises a housing, a probe and a transducer. An analog-to-digital converter is coupled to the transducer output. The vibration monitor includes an interface configured to transmit digital data including vibration parameters derived from the digitized analog signal to processing circuitry external of the housing.

U.S. Patent Application Publication No. 2005/0284226, published on Dec. 29, 2005 to Boda et al., discloses a vibration information transmission apparatus for improving the efficiency of field wiring of a vibration monitoring/analyzing system. The apparatus includes transmitters for conversion of vibration information from vibration sensors for detecting vibration of an object to be measured into an electrical signal and then outputting the electrical signal to a digital network. The transmitter includes a transducer circuit for converting the vibration information from the vibration sensors into an analog electrical signal. The transmitter also includes an analog-to-digital conversion circuit for converting the analog electrical signal from the transducer circuit into a digital signal. A network interface is provided for outputting the digital signal from the analog-to-digital conversion circuit to the digital network.

U.S. Patent Application Publication No. 2009/0231153, published on Sep. 17, 2009 to Hauenstein et al., teaches a compact self-contained condition monitoring device. This device is for monitoring fans, compressors, turbines, or other rotating or reciprocating pieces of machinery. The method includes the step of sensing in a first device both a start-up vibration at a start-up time after the first device is affixed to a second device to be monitored and a subsequent vibration level at a subsequent time after the start-up time. A signal containing information about the start-up vibration level of the second device and a vibration level signal containing information about the subsequent vibration level of the second device is provided. The first device is monitored so as to sense the condition of operation of the second device based upon a comparison of the start-up vibration level signal in relation to the subsequent vibration level signal.

It is an object of the present invention to provide a radio frequency extender device that expands the reach of wireless devices.

It is another object of the present invention to provide a radio frequency extender device to provide safety in hazardous environments.

It is another object of the present invention to provide a radio frequency extender device that improves accessibility in hard-to-reach areas.

It is another object of the present invention to provide a radio frequency extender device that utilizes only a single cable conduit.

It is Another object of the present invention to provide a radio frequency extender device that allows access to multiple devices from a single location.

It is another object of the present invention to provide a radio frequency extender device that eliminates the need to access devices manually.

It is still a further object of the present invention to provide a radio frequency extender device that requires no ancillary electricity.

It is another object of the present invention to provide a radio frequency extender device that provides an air gap to isolate the electrical signals.

It is a further object of the present invention to provide a radio frequency extender device that is easy to manufacture, easy to use, and relatively inexpensive.

It is another object of the present invention to provide a radio frequency extender device that facilitates the ability to receive the output of vibration sensors.

It is still a further object of the present invention to provide a radio frequency extender device that allows for the monitoring of vibration sensors associated with multiple machines from a single location or from multiple locations.

These and other objects and advantages of the present invention will become apparent from a reading of the attached specification and appended claims.

BRIEF SUMMARY OF THE INVENTION

The present invention is a radio frequency extender device for extending the effective range of discrete wireless radio frequency networks by a combination of wired and wireless connections. The present invention allows two or more remote wireless radio frequency networks to be linked together using a combination of wired and wireless connections. In particular, two or more wireless radio frequency networks are linked using a wired conductor in which the radio frequency networks can be coupled by connecting, pairing, or syncing. This serves to expand the effective range of the radio frequency networks beyond their normal distances. In particular, the extender device is for use in association with radio frequency transmitters and receivers operating in the effective range of 2-5 GHz.

In particular, the extender device of the present invention includes a radio frequency transmitter, such as a Bluetooth device, that can be part of an instrument or a vibration sensor. The radio frequency transmitter serves to transmit a high-frequency signal in the range of 2-5 GHz. A receiver is located at a location remote from the transmitter so as to produce a humanly-perceivable signal relative to the transmission from the transmitter. A cable conductor will extend between the transmitter and the receiver. The cable conductor has one end spaced from the transmitter and an opposite end that is spaced from and communicates with the receiver.

The cable conductor of the present invention includes a copper wire, an insulator that extends over and along the copper wire, a shield that extends over and along the insulator, and an outer jacket that overlies the shield. The copper wire extends outwardly from opposite ends of the insulator for a distance equal to a whole number fraction (½, ⅓, ¼, etc.) of a fundamental frequency including for example, one-quarter wavelength of the signal of the transmitter. A frequency adjuster can be coupled to at least one of these ends of the copper wire. An impedance adjuster can be coupled or cooperative with these ends of the copper wire. One end of the copper wire serves as a pickup end an opposite end of the wire is a portal end. In particular, as used in the present invention, the copper wire is a solid copper core, but could also include copper clad steel, standard copper or other suitable conductors.

The ends of the copper wire act as antennas. These antennas can be mono-pole, dipole and printed circuit boards. The core of the cable conductor can be the copper wire or a conductor/insulator, including a printed circuit board, for example, other known antenna designs. The insulator has compatible impedance matching. In fact, all of the components should be properly impedance matched for optimum performance. The cable conductor can be routed through physical barriers, such as walls, by using standard wall plate fixtures or hole penetrations. The conductor can be grounded.

The radio frequency extender device can be applied to radio frequency networks, such as, personal area networks, and wireless personal area networks. The radio frequency transmission is in the FCC ISM band of 2-5 GHz. In particular, this can be used with Zigbee, Bluetooth, and Wi-Fi systems.

The insulator extends over and along the copper wire. The insulator can have an adjustable length end adapter so as to control impedance of the signal passing through the copper wire. The shield can be formed of a conductive material. In the preferred embodiment the present invention, the shield is a four-layer quad shield. The shield extends along the length of the insulator. The insulator is interposed between the shield and the copper wire. The outer jacket overlies the shield. The outer jacket is formed of an electrically non-conductive polymeric material. The shield is interposed between the outer jacket and the insulator. The length of the insulator, the shield and the outer jacket are generally equal.

The end of the copper wire of the cable conductor is slightly spaced from the radio frequency transmitter so as to avoid a direct electrical connection therewith. As such, the copper wire of the cable conductor should be located adjacent to and in proximity to the transmitter so as to receive radio frequency information from the transmitter. The transmitter can be associated with a vibration sensor. The vibration sensor can be connected to any vibrating device, such as a motor, a pump, a compressor, a turbine, a fan, or other rotating device.

The receiver can be in the nature of a computer, a personal digital assistant, a smart phone, an iPad, an iPhone, or similar radio frequency receiving devices. The receiver is positioned adjacent to the opposite end of the copper wire of the cable conductor. The receiver can have an adjustable angle with respect to the opposite end of the copper wire. In general, the receiver will be in generally parallel relationship and spaced from the opposite end of the copper wire. The opposite end of the wire can be coupled to a pad upon which the receiver is placed.

An electro-inductive wireless using charger using magnetic resonant coupling can be connected to the cable conductor. In such a circumstance, a switching device is provided with the cable conductor so as to establish a circuit between the copper wire and the conductive material of the shield. As such, the end of the copper wire can be coupled to a coil. The coil can be placed in proximity to the transmitter device. As such, the cable conductor can serve as a recharger for the transmitter device. This can result in the transmitter device simply having a rechargeable battery, rather than a transmitter device that requires repeated changing of the battery. A Pi network can be coupled to the cable conductor so as to in change the internal resistance of the cable conductor. An amplifier can also be coupled to the cable conductor so as to amplify the signal transmitted by the copper wire. A splitter can be coupled to the cable conductor so as to allow the cable conductor to transmit signals to receivers in different locations. The cable conductor can have a length of up to 150 feet or more.

In the present invention, in order to extend the signal of the radio frequency transmitter it is only necessary to place one end of the copper wire of the cable conductor in proximity to the transmitter device on the vibration sensor of the rotating machine, extend the cable conductor to a desired location, and then position the opposite end of the copper wire of the cable conductor in proximity to the receiver. As such, the high frequency signal of the transmitter device can be received a significant distance away from the transmitter device. This facilitates the ability to monitor the condition of the rotating machine in a remote location and enhances the ability to assess the condition of multiple rotating machines at a single location. This eliminates the need for a worker to move into a location in proximity to the radio frequency transmitter of the vibration sensor in order to collect data.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
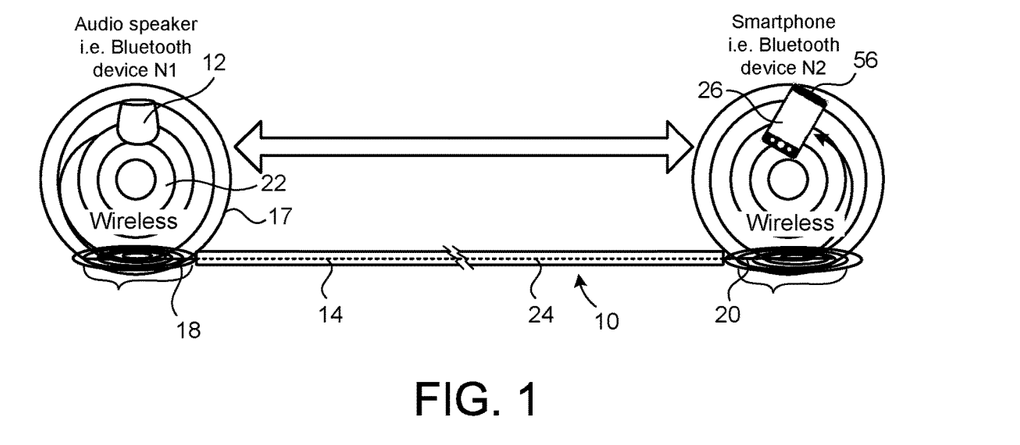
FIG. 1 is a view of a simple embodiment of the radio frequency extender of the present invention.

Referring to FIG. 1, there is shown a simple embodiment of the radio frequency extender device 10 in accordance with the present invention. The radio frequency extender device 10 includes a radio frequency transmitter 12, a cable conductor 14, and a receiver 16. The radio frequency transmitter 12 can be associated with a vibration sensor that is cooperative with a rotating machine, such as a pump, a fan, a motor, a turbine, compressor, or similar vibration generating device. The radio frequency transmitter 12 transmits a high-frequency radio signal 17 (between 2-5 GHz) outwardly therefrom. The cable conductor 14 has a first end 18 and a second end 20. Each of the ends 18 and 20 can be exposed ends of copper wire of the cable conductor 14. Alternatively, they can be in the form of antennas such as printed circuit boards, monopole, or dipole antennas. The cable conductor 14 will have an internal configuration similar to that shown in FIG. 3 hereinbelow. The end 18 is located in proximity to the radio frequency transmitter 12. There is an air gap 22 between the radio frequency transmitter 12 and the end 18 of cable conductor 14. The end 20 of the cable conductor 14 is located in proximity to the receiver 16. As illustrated in FIG. 1, the receiver is in the nature of a personal digital assistant, such as a smart phone.

In FIG. 1, the radio frequency signal from the transmitter 12 will be received by the end 18 of the cable conductor 14. The copper wire 24 will carry the radio frequency signal from the transmitter 12 to the end 20. The receiver 16 will receive the signal from the end 24 of copper wire 24. The signal can be processed and displayed on screen 26 of the receiver 16.

Importantly, the transmitter 12 induces an alternating current into the conductor, i.e. copper wire 24. This generates electromagnetic forces (emf) along the copper wire 24. This ultimately produces and emits radio waves out of the antenna of the transmitter 12. The electromagnetic forces generated by high-frequency radio transmissions enable them to travel through space at the speed of light until they reach a suitable conductor. The electromagnetic forces entering the end 20 of the cable conductor 14 again induce an alternating current that produces a corresponding radio frequency emission out of the end 20 of the cable conductor 14. These radio frequency emissions will travel through space until they reach the receiving antenna of the receiver 16. The receiver 16 receives an induced alternating current into its antenna and processes the data so as to complete the transmission.

Use of the extender device 10, the method, the system and the apparatus apply to various wireless transmissions having a radio frequency of between 2-5 GHz. The conductor cable 14 must be rated for these high-frequency transmissions. The copper wire of the core of the conductor should be configured as an efficient receiving/transmitting antenna for these 2-5 GHz radio frequency transmissions. The transmitter and corresponding receiver antennas must be in close proximity to the cable conductor in order to effect a proper signal transfer.

Figure 2:
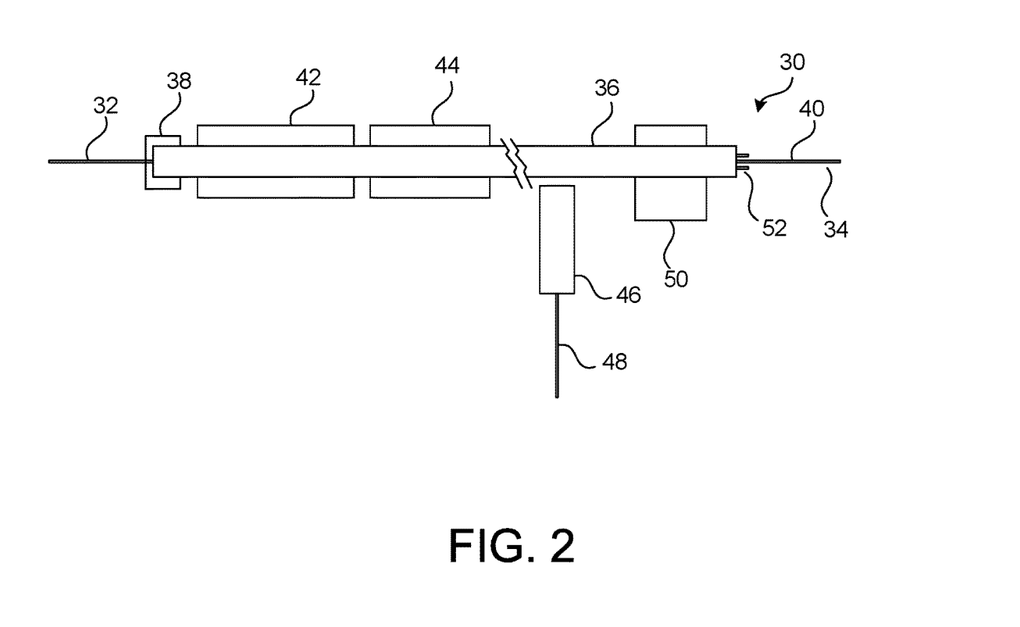
FIG. 2 is a diagrammatic illustration of a more complex embodiment of the radio frequency extender of the present invention.

FIG. 2 shows a more complex configuration of the receiver 30 portion of the extender device 10. As can be seen, the receiver 30 has an end 32 and an opposite end 34. The end 32 will be placed into proximity to the radio frequency transmitter. The opposite end 34 will be placed in proximity to the radio frequency receiver 16.

The cable conductor 36 is a cable, e.g. RG6 or RG6Q, that may be inside a separate conduit. The cable conductor 36 will have typical cable shielding such as a braid and/or a foil. The ends 32 and 34 will extend outwardly of the cable conductor 36. A cable-wire termination 38 is positioned at the end of the cable conductor 36 and over the end 32 of the copper wire 40 so as to allow for the exposed length of the end 32 of the copper wire 40. In one configuration, the exposed end 32 of the copper wire 40 will have a length of approximately one quarter of the wavelength of the signal from the transmitter 12 other configurations include whole numbered fraction of the signal wavelength. Similarly, the exposed opposite end 34 of the copper wire 40 will have a similar length. A signal booster 42 can be cooperative with the cable conductor 36 and with the copper wire 40 so as to boost this transmitted signal along the wire 40. This signal booster can include a powered amplifier. An administrative control system 42 can also be cooperative with the cable conductor 36. This administrative control system 42 can incorporate digital, analog signals, or a combination thereof. As an example, the administrative control system 42 can be a switching system so as to provide a charge through the device 30. In one form, the copper wire 40 will simply transmit the signal from the transmitter 12. In another form, a switch is activated so as to establish a circuit within the cable conductor 36 so that charging energy can be delivered to the transmitter device 12 by way of an electro-inductive coil. The administrative control system 42 can also employ resistive, inductive and capacitive adjusters so as to fine-tune frequency, response and performance. A splitter link 46 is connected to the cable conductor 36 so as to allow the signal from the copper wire 40 to be delivered along copper wire 48 to another location away from the opposite end 34 of the copper wire 40. The splitter device 46 can also use an antenna so as to transmit and receive the signal. A Present invention network 50 is coupled to the cable conductor 36 so as to allow for the adjustment of impedance. Various circuits can be employed in the Present invention network so as to properly adjust the impedance of the signal that is transmitted along the copper wire 40 of the cable conductor 36. Adjustable length cable shielding 52 can be employed over the opposite end 34 of the copper wire 40. This can provide for more precise adjustment of the exposed length of the copper wire 40.

The system 30 remotely links radio frequency transmission devices. It also links and manages separate and/or isolated radio frequency networks. The extender device 30 can be adapted to Bluetooth defined bandwidths such as 2402 and 2480 MHz or 2400 and 2483.5 M. In effect, the ends 32 and 34 of the coupler 40 act as antennas. A space or gap (such as space 22 of FIG. 1) allows for a radio frequency link between the cable conductor 36 and the wireless and wired conductors.

The cable conductor 34 is, in the preferred embodiment, RG6Q quad shielded cable with 18 Awg copper wire. The cable conductor 36 directs and guides a flow of electromagnetic frequency (i.e. including, but not limited to electrons, photons and plasma) through a constraint or conduit so as to deliver the electromagnetic frequency signal to a desired location. It can deliver electrons in the form of pulsing electrical waves, such as radio waves. It can also deliver photons in the form of light waves, such as laser beams, using radio frequency technology and other cable conductors, such as fiberoptic cable. The extender device 30 involves the management of electrical conductors, such as insulated cables, optical conductors, and fiber-optic cables. The different types of cables allow for the managing and control of the dielectric properties of insulating components.

Figure 3:
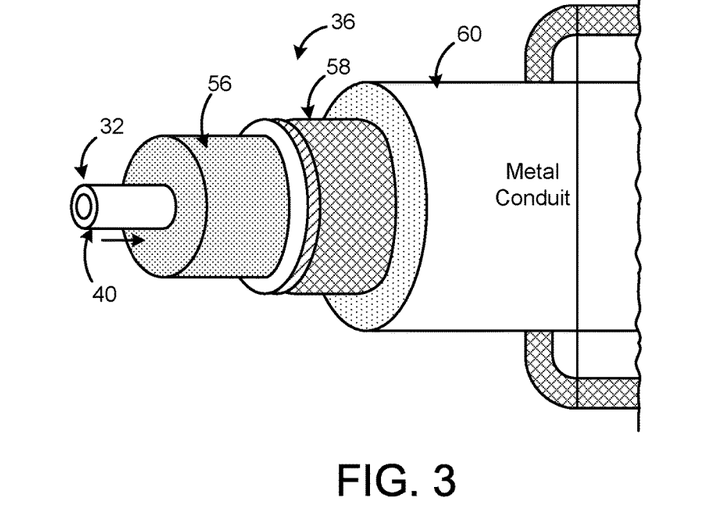
FIG. 3 is an exposed perspective view of the various layers of the cable conductor at one end of the cable conductor deployed inside a typical metal conduit as used in the radio frequency extender of the present invention.

FIG. 3 is a cut-away illustration of the cable conductor 36 as used in the extender device 30 of the present invention. In particular, FIG. 3 shows the end 32 of copper wire 40 as exposed beyond the end of the insulator 56. The insulator 56 is an electrically insulating material that overlies the outer diameter of the copper wire 40. A shield 58 overlies the insulator 56 such that the insulator 56 is interposed between the shield 58 and the copper wire 40. The shield can be a four-layer quad wire-braided shield. An outer jacket 60 overlies the shield 58. The outer jacket 60 should be of a non-conductive polymeric material. The shield 58 will thereby be interposed between the inner surface of the outer jacket 60 and the outer surface of the insulator 56. In general, in contrast to that illustrated in FIG. 3, the insulator 56, the shield 58 and the outer jacket 60 will have an approximately equal length. The length of the insulator 56 relative to the exposed end 32 of the copper wire 40 is a function of the wavelength of the signal being transmitted along the copper wire 40.

Figure 4:
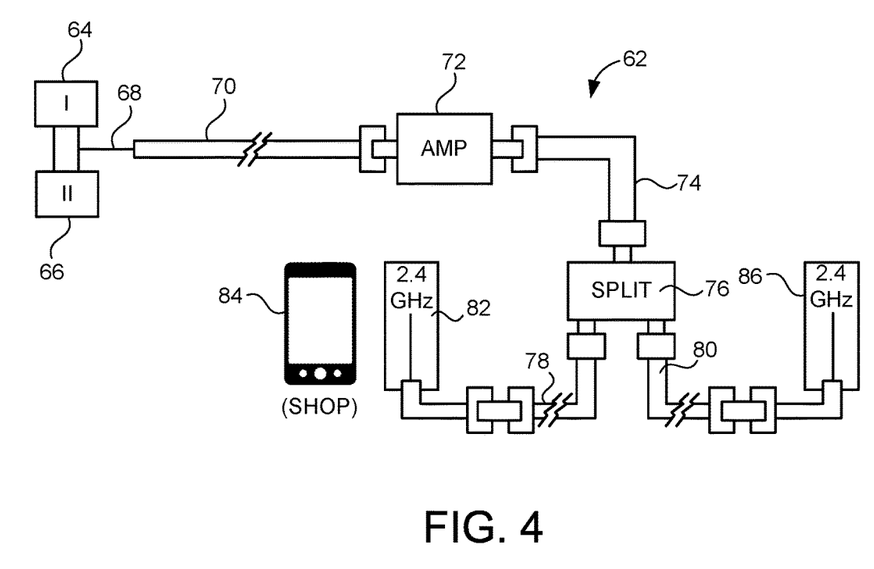
FIG. 4 is an illustration of one network employing the radio frequency extender of the present invention.

FIG. 4 shows a network 62 employing the extender device of the present invention. In FIG. 4, transmitter devices 64 and 66 are in proximity to the exposed end 68 of copper wire. The cable conductor 70 extends so as to be connected to an amplifier 72. An optional amplifier 72 will amplify the signal passing along the copper wire 68 passing through the cable conductor 70 and transmit this amplified signal along cable conductor 74. Cable conductor 74 is joined to a splitter 76. Splitter 76 will divide the signal from the cable conductor 74 to a conductor 78 and a conductor 80. Conductor 78 will ultimately pass the signal to a pad 82 located in proximity to a receiver 84. Similarly, conductor 80 will pass the signal to a pad 86 associated with another receiver. As such, the signal from the transmitters devices 64 and 66 can be received by separate receivers. These can be in different locations in the facility.

Figure 5:
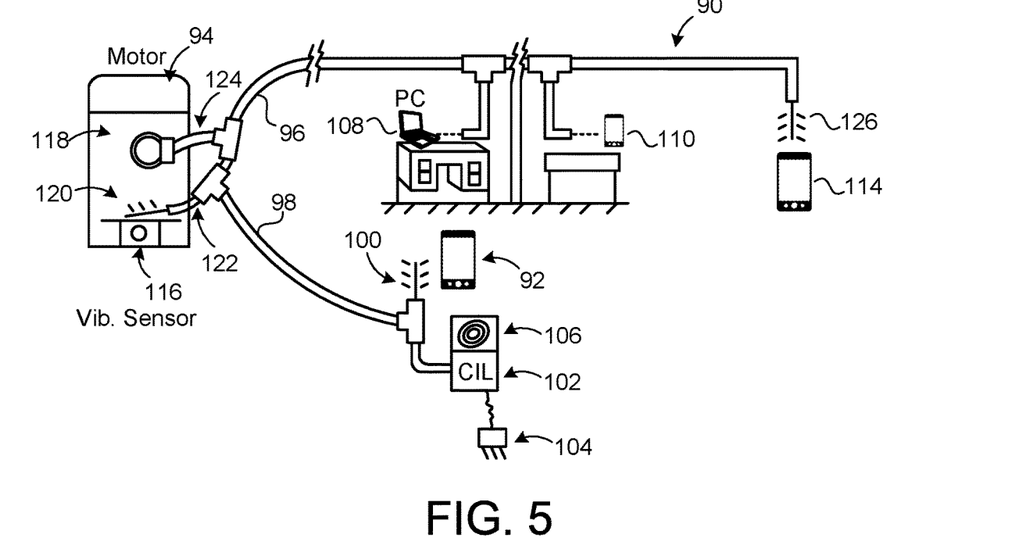
FIG. 5 is a diagrammatic illustration of another network employing the radio frequency extender of the present invention.

In certain circumstances, the extender device of the present invention can be employed in a network 90 as shown in FIG. 5. In this configuration, the extender device facilitates the ability to charge the transmitter 116. A power supply 102 is coupled to the cable conductors 98 so as to provide an output charging power to the sensor with a compatible chargeable battery. In normal use, the power supply circuit 102 will be turned off so that the exposed end 120 of the copper wire of cable conductor 122 will receive the signal from the transmitter 92. However, the cable conductor 98 and 122 can also be connected to an electro-inductive coil 106. Electro-inductive coil 102 can be joined to a plug 104 so as to receive power from an external power supply.

In FIG. 5, the cable conductors 122 and 96 serve to transmit information obtained from the transmitter 116 to a personal computer 108 at a remote location. It can also deliver information to a receiver, such as iPhone 110, at another location. The receiver 114 can also receive information from the exposed copper wire 126 associated with transmitter 116. In this manner, the cable conductors can be extended amongst the various vibration sensors in a facility so that information from all the vibration centers can be presented at the personal computer 108 and/or the personal digital assistant 110. As such, all of this information can be received at a single or at multiple locations without the need to traverse the facility so as to receive information from the high frequency transmission at the vibration sensor.

Figure 6:
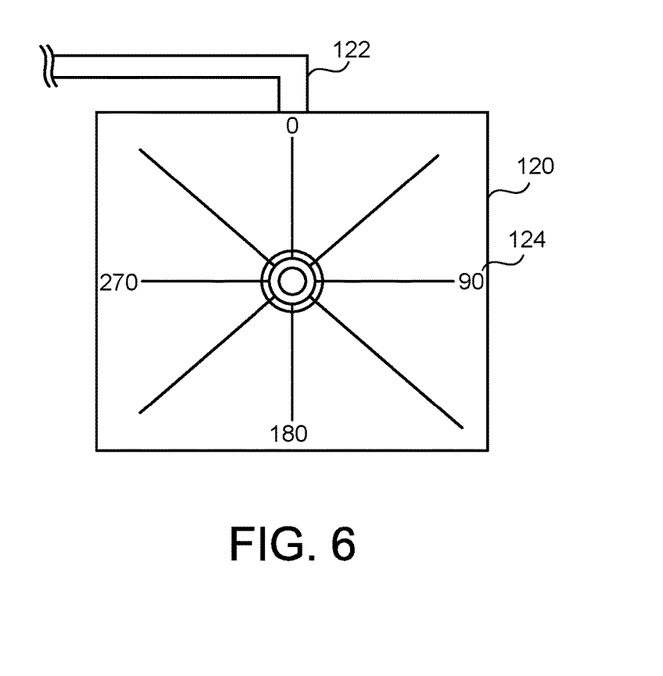
FIG. 6 is a plan view showing a portal pad and angle adjuster for use with the radio frequency transmitter/receiver of the Bluetooth extender of the present invention.
Figure 7:
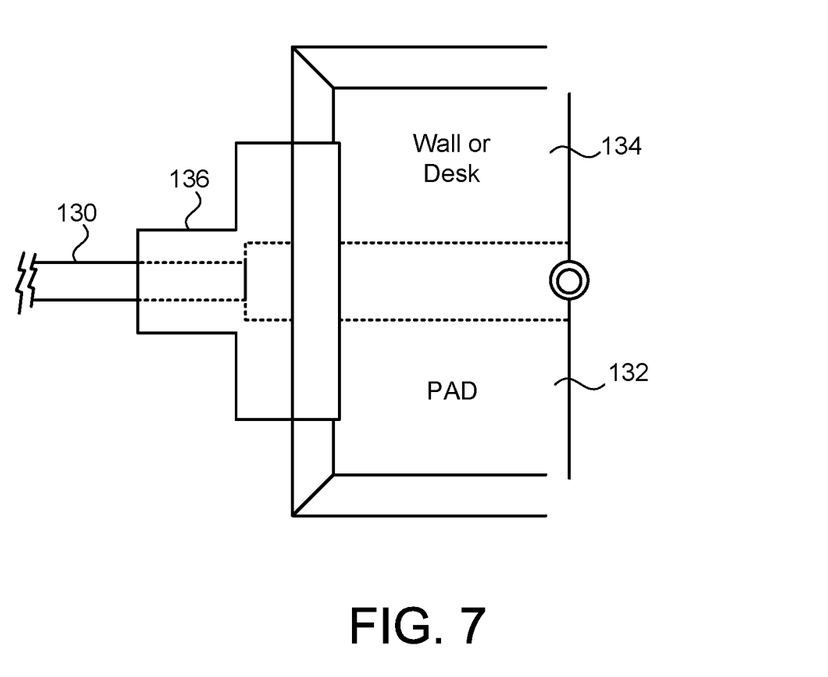
FIG. 7 is a plan view showing the connection of the opposite end of the cable connector being inserted into the portal pad opening of FIG. 6.

FIG. 6 shows a desktop or wall pad 120 that can be used in cooperation with the receiver. The cable conductor 122 can be joined to the pad 120 so that the exposed end of the copper wire is located internal of the pad 120. It is known that the receiver will produce better results and receive the optimal signal straight by being oriented in a proper orientation. As such, pad 120 provides the ability to adjust the orientation of the receiver through 360° of rotation. For example, if the optimal signal strength is received when the receiver is located at 90°, then the user will know to always orient the receiver at orientation 124. This system helps to align the polarity of the receiver with the cable conductor 122.

Figure 8A:
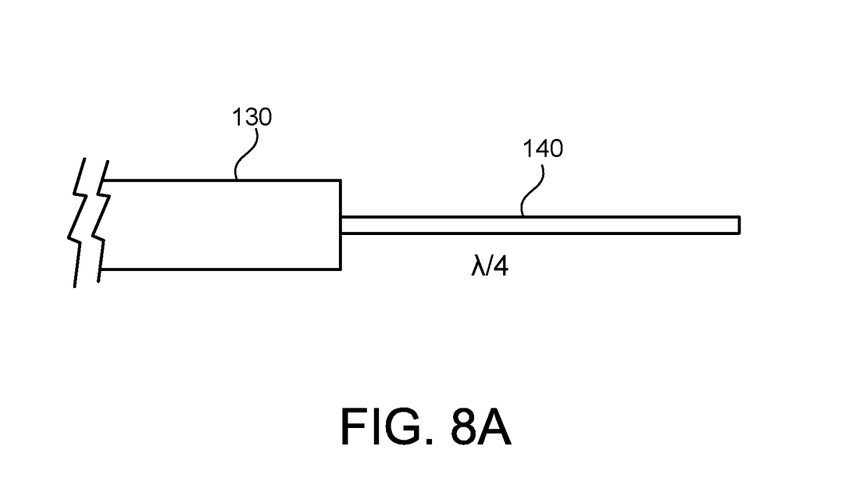
FIGS. 8A-C show various forms of the pickup as used at the end of the cable conductor of the radio frequency extender of the present invention.
Figure 8B:
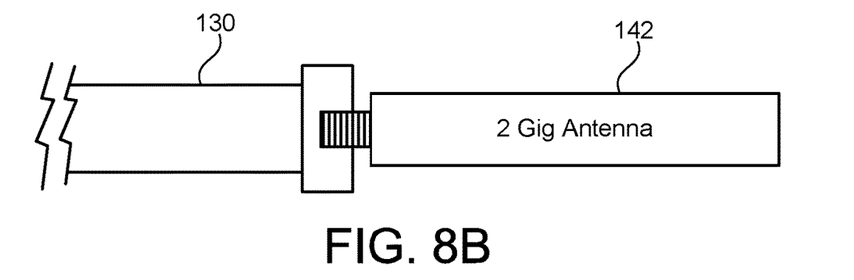
Figure 8C:
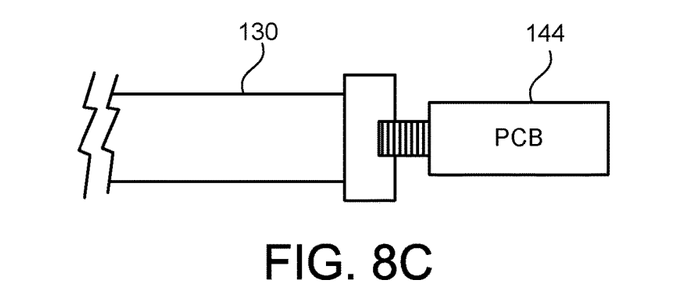

FIGS. 8A-C show the cable conductor 130 in various forms in association with the exposed ends of the copper wire of the cable conductor. FIG. 8A shows an exposed end of copper wire 140 extending outwardly of the cable conductor 130. The exposed end 140 of the copper wire will have a length (in this example of a whole number fraction) of one quarter the wavelength of the signal. FIG. 8B shows that there is an impedance matched 2.4 gig antenna 142 that is coupled to the copper wire within the cable conductor 130. FIG. 8C show the shows that there is an impedance matched printed circuit board 140 that is coupled to the cable conductor 130. The various forms shown in FIGS. 8A-C can be integrated into the wall or desk 134 or the pad 132 so as to achieve signal optimization.

Figure 9:
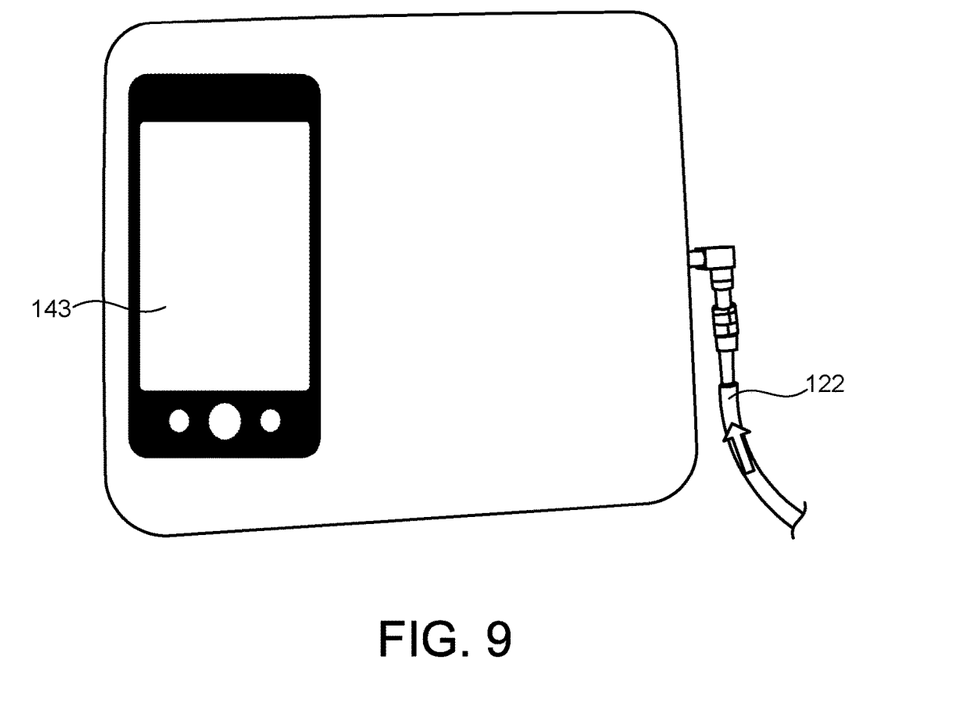
FIG. 9 is a plan view showing the placement of the radio frequency receiver upon a pad associated with one end of the cable conductor.

FIG. 9 shows the pad 120 of FIG. 6 as used in association with a radio frequency receiver 143. It can be seen in FIG. 9 that the pad 120 is a foam pad or other hollow structure. The pad 120 has cable conductor 122 connected thereto. Ultimately, the exposed end of the copper wire, the antenna, or the printed circuit board associated with this end of the cable conductor 22 can be embedded within the pad 124 can be placed on the backside of the foam pad 120. The pad 120 facilitates the ability to place the receiver 143 on any horizontal desktop. The pad 120 has the conductor antenna embedded into the pad and presents the wire as close to the surface as possible. In one configuration, the top surface of the pad 120 would have a printed circle (such as shown in FIG. 6) in the center so as to achieve 0-360° of alignment. The receiver 143 is a monitoring device, such as a smart phone. This receiver 143 would be placed on the pad of the preferred position of alignment, such as 45°. The top-to-bottom position would also be used for optimal performance. Similarly, the right-to-left position would be used for optimal performance. Once the device is positioned in these three optimal orientations, it would remain attached in position unless and until all readings were obtained.

Figure 10:
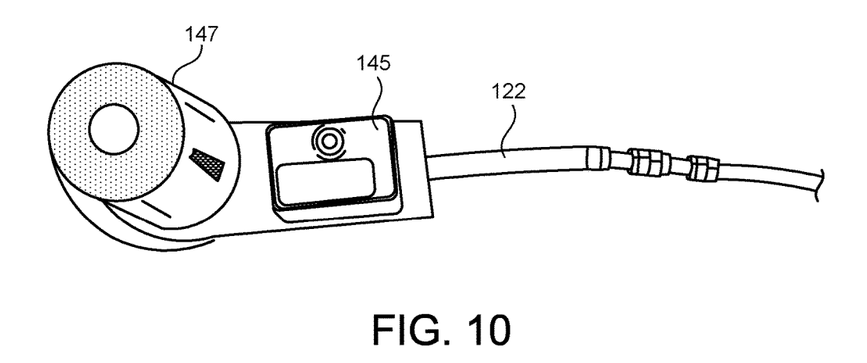
FIG. 10 is a plan view showing the radio frequency transmitter as connected to a vibration sensor and positioned upon a pad that is connected to an end of the cable conductor.

FIG. 10 shows the opposite end of the cable conductor 122 as connected to a transmitter 145 associated with a vibration sensor 147. The cable conductor 122 is coupled to a foam pad 149 so as to achieve proper positioning. The minimum thickness pad 149 should be adapted based upon the antenna design and for the specific location of the transmitter 145. This example of pad 149 can be a foam pad that fills the gap between the motor surface and that the backside of the device facing the motor surface. The foam pad 149 forms a rectangle of 1 inch×3 inches×⅜ inches thick with the conductor core on the facing side of the device. The pad 149 can be positioned by use of a simple tether or cable tie. The foam and the tether would keep the pickup in its optimum orientation. Once in place, it would remain attached in position until and unless it is moved for maintenance or repositioning.

The cable conductor 122 (as shown in FIGS. 9 and 10) can be a any suitable antenna quality cable, for example RG6, RG58, or preferably RG6Q cable. RG6Q cable has four or quad shielding to prevent undesirable radio frequency interference. The conductor 122 is routed from the originating device location through any physical barriers, such as walls, by using standard wall plate fixtures or simple hole penetrations. The conductor may be grounded by standard hardware to prevent undesirable radio frequency interference stray static electrical charges and to protect from lightning. Solid copper core center wire is preferred as the conductor due to its lower electrical resistance relative to copper clad steel conductors.

Figure 11:
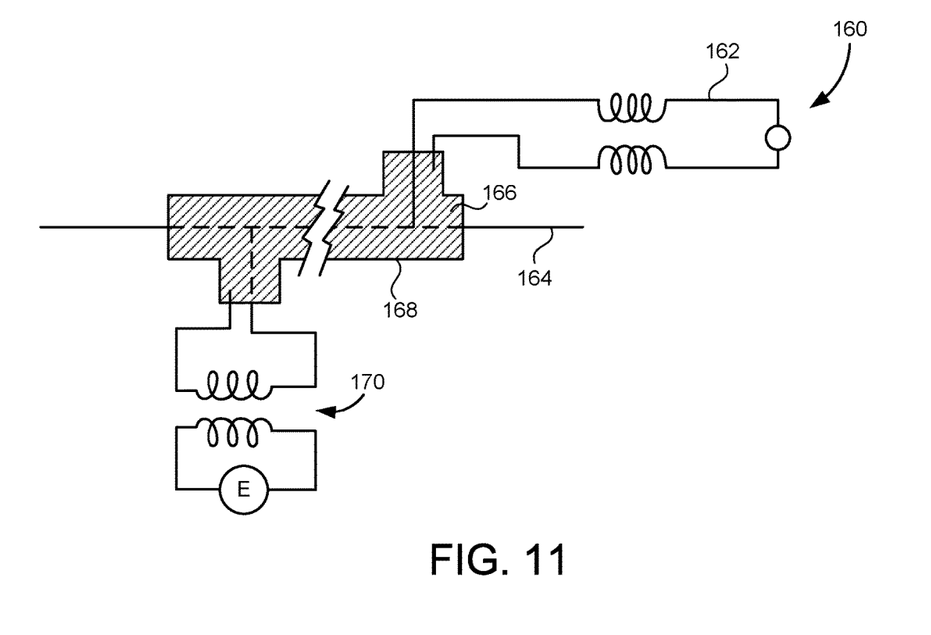
FIG. 11 is an electrical schematic showing the use of the radio frequency extender of the present invention with an electro-inductive battery charger.

FIG. 11 shows the charging mechanism 164 allowing the extender device of the present invention to transmit a charging signal to the sensor device. In particular, there is a switch 160 that is cooperative with the copper wire 164 and also cooperative with the shielding 166. Switch 162 can selectively establish a circuit between the copper wire 164 and the conductive shielding 166. This allows energy to be transmitted through the cable conductor 166 to the electro-inductive coil 170. The switch 162 can be a radio frequency transmitter or an electron transmitter. Since the electro-inductive coil 170 is located in proximity to the transmitter, the charging system 160 can be utilized so as to charge the rechargeable battery of the Bluetooth device and the vibration monitor.

Figure 12:
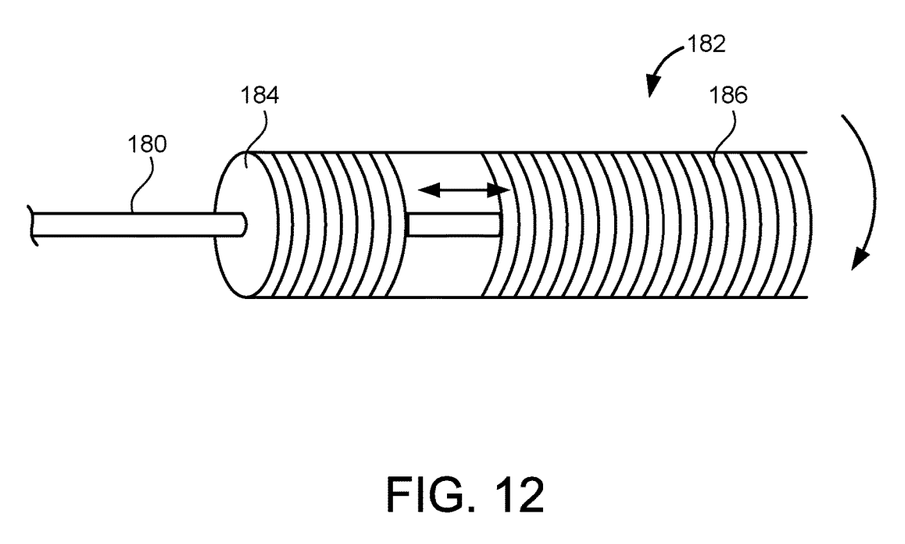
FIG. 12 is a perspective view showing a mechanism for adjusting the length of the insulator for controlling the impedance of the signal passing through the copper wire of the radio frequency extender of the present invention.

In certain circumstances, it may be necessary to adjust the impedance in the copper wire 180. FIG. 12 shows an impedance adjustment device 182 that can be cooperative with the insulation 184 of the cable conductor. In FIG. 12, the jacket 186 can be in threaded relationship with the insulator 184. As such, a rotation of the jacket 186 will cause the insulator 184 to expand in length or retract in length. The change of the length of the insulator 184 will adjust the impedance of the signal passing through the copper wire 180.

In the present invention, the extender device requires close proximity at both ends of the cable conductor. In general, the closer the ends of the cable conductor are to the particular devices, the better the reception. The transmitter and receiver points terminating structures that serve as antennas. The antenna design may include, but is not limited to, monopole antennas, dipole antennas and printed circuit boards. The performance of the antenna depends on normal design criteria, conductors, insulators, shielding, and other items. The antenna core may be a simple wire with a diameter or as, as an alternative, for example, a conductor/insulator designed printed circuit board. The antennas's performance as a function of the orientation of the pickup conductor and the portal conductor orientation in all three planes. The antenna core conductor is typically surrounded by suitable insulating material with a compatible impedance match. All components including all conductor connections should be impedance-matched to maintain system optimization. The transmitter and receiver performance is "tuned" for optimum performance with a one-time alignment procedure specific to both pick-up and portal antenna designs. Each device will have a preferred orientation based upon their respective antenna design. The orientation can be reused as long as the originating device and/or monitoring device antenna remain the same. Multiple orientation devices and/or monitoring devices use a function of the originating signal intensity.

The technology associated with the radio frequency extender of the present invention applies to practical radio frequency applications, for example, personal area networks and wireless personal area networks. A personal area network is a computer network used for data transmission among devices such as computers, telephones, tablets and personal digital assistants. A wireless personal area network is a low-powered PAN carried over a short-distance wireless network. In particular, this short-distance wireless network technology can include a Piconet which is an adhoc network that links a wireless user group of devices using Bluetooth technology protocols. The Piconet consists of two or more devices occupying the same physical channel and are synchronized to a common clock and hopping sequence. It allows one master device to interconnect with up to seven active slave devices. Up to 255 further slave devices can be in active, or parked. The scatter net is a type of adhoc computer network consisting of two or more Piconets. These terms are often applied in high-frequency wireless technology.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A radio frequency extender device comprising:
    a radio frequency transmitter;
    a receiver positioned at a location remote from said radio frequency transmitter, said receiver adapted to produce a humanly perceivable signal from a transmission from said radio frequency transmitter; and
    a cable conduit extending between said radio frequency transmitter and said receiver, said cable conduit having one end spaced away from said radio frequency transmitter and an opposite end spaced away from said receiver, said cable conduit adapted to transmit the transmission from said radio frequency transmitter to said receiver, said cable conduit comprising:
    a copper wire;
    an insulator extending over and along said copper wire;
    a shield extending over and along said insulator; and
    an outer jacket overlying said shield, said copper wire having ends extending outwardly respectively from opposite ends of said insulator, each of the ends of said copper wire extending outwardly of said insulator for a distance equal to a whole number fraction of a fundamental frequency of the transmission from said radio frequency transmitter.

2. The radio frequency extender device of claim 1, said radio frequency transmitter being a Bluetooth™ device that is connected to an instrument or to a vibration sensor.

3. The radio frequency extender device of claim 1, said radio frequency transmitter comprising:
    an instrument; and
    a Bluetooth™ device connected to said instrument, the Bluetooth device adapted to transmit data from said instrument to said one end of said cable conduit.

4. The radio frequency extender device of claim 1, said radio frequency transmitter comprising:
    a vibration sensor; and
    a Bluetooth device connected to said vibration sensor, the Bluetooth device adapted to transmit data from said vibration sensor to said one end of said cable conduit.

5. The radio frequency extender of claim 1, said radio frequency transmitter transmitting a high frequency signal in a range of between 2 GHz and 5 GHz.

6. The radio frequency extender device of claim 1, further comprising:
    an impedance adjuster coupled to or cooperative with at least one of the ends of said copper wire.

7. The radio frequency extender device of claim 1, said shield being formed of a conductive material, said shield extending for an entire length of said insulator, said outer jacket being formed of an electrically non-conductive material.

8. The radio frequency extender device of claim 1, said cable conductor having a length of up to 150 feet.

9. The radio frequency extender device of claim 1, the one end of said cable conductor being spaced away from said radio frequency transmitter so as to have no direct electrical connection therewith.

10. The radio frequency extender device of claim 4, further comprising:
    a vibrating device affixed to said vibration sensor, said vibrating sensor adapted to sense or detect vibration from said vibrating device.

11. The radio frequency extender device of claim 10, said vibrating device selected from the group consisting of a motor, a pump, a compressor, a turbine, and a fan.

12. The radio frequency extender device of claim 1, said receiver selected from the group consisting of a computer, a personal digital assistant, a smart phone, an iPad™, and an iPhone™.

13. The radio frequency extender device claim 1, said receiver being angularly adjustable with respect to the opposite end of said cable conductor.

14. The radio frequency extender device of claim 1, further comprising:
    a pad to which the opposite end of said cable conductor is coupled, said receiver being placeable upon a surface of said pad.

15. The radio frequency extender device of claim 1, further comprising:
    a charging device connected to the said cable conductor, said charging device causing a circuit between said copper wire and a conductive material of said shield; and
    a coil connected to the one end of said cable conductor, said coil adapted to be placed in proximity to said radio frequency transmitter so as to recharge said radio frequency transmitter.

16. The radio frequency extender device of claim 1, further comprising:
    an amplifier coupled to said cable conductor so as to amplify the transmission transmitted by said cable conductor.

17. The radio frequency extender device of claim 1, said receiver comprising a plurality of receivers, the radio frequency extender device further comprising:

a splitter coupled to said cable conductor so as to allow said cable conductor to transmit the transmission to the plurality of receivers.

* * * * *